(12) United States Patent
Smith et al.

(10) Patent No.: US 12,175,341 B2
(45) Date of Patent: Dec. 24, 2024

(54) APPARATUS AND A METHOD FOR HIGHER-ORDER GROWTH MODELING

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/141,725

(22) Filed: May 1, 2023

(65) Prior Publication Data

US 2024/0370761 A1 Nov. 7, 2024

(51) Int. Cl.
*G06N 20/00* (2019.01)

(52) U.S. Cl.
CPC ..................... *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 6,859,785 B2 | 2/2005 | Case | |
| 7,734,526 B2 | 6/2010 | Howard | |
| 10,748,072 B1 * | 8/2020 | Seeger | G06N 7/01 |
| 2014/0207527 A1 | 7/2014 | Garvey | |
| 2021/0081819 A1 * | 3/2021 | Polleri | G06N 5/022 |

OTHER PUBLICATIONS

Gregory Hancock, "Second-Order Latent Growth Models with Shifting Indicators", 2008 (Year: 2008).*
Huang, "A Data-based Platform for Supporting Profit-driven Strategy in the Italian Spot Electricity Markets", IEEE, 2020 (Year: 2020).*
Hsieh, "A fuzzy-based growth model with principle component analysis selection for carpal bone-age assessment" (Year: 2009).*

* cited by examiner

*Primary Examiner* — Van C Mang
(74) *Attorney, Agent, or Firm* — Caldwell Intellectual Property Law

(57) ABSTRACT

An apparatus for higher-order growth modeling is disclosed. The apparatus comprises at least a processor and a memory communicatively connected to the at least a processor. The memory instructs the processor to receive a growth constraint profile from a user, to generate a plurality of strategy data as a function of the growth constraint profile, wherein the strategy data comprises a first strategy datum and a second strategy datum, to apply the plurality of strategy data to the growth constraint profile using a growth simulation, to predict growth data as a function of the application of the plurality of strategy data to the growth constraint profile, to identify second-order data as a function of the growth data, and to display the second-order data using a display device.

20 Claims, 10 Drawing Sheets

APPARATUS AND A METHOD FOR HIGHER-ORDER GROWTH MODELING

FIELD OF THE INVENTION

The present invention generally relates to the field of artificial intelligence. In particular, the present invention is directed to an apparatus and a method for higher-order growth modeling.

BACKGROUND

Identifying and tracking growth has always been an inexact and labor-intensive exercise. Having an apparatus that identifies information related to growth and displaying it in a palatable manner is highly desirable.

SUMMARY OF THE DISCLOSURE

In an aspect, an apparatus for higher-order growth modeling is disclosed. The apparatus comprises at least a processor and a memory communicatively connected to the at least a processor. The memory instructs the processor to receive a growth constraint profile from a user. The memory instructs the processor to generate a plurality of strategy data as a function of the growth constraint profile, wherein the strategy data comprises a first strategy datum and a second strategy datum. The memory instructs the processor to apply the plurality of strategy data to the growth constraint profile using a growth simulation. The memory instructs the processor to predict growth data as a function of the application of the plurality of strategy data to the growth constraint profile. The memory instructs the processor to identify second-order data as a function of the growth data. The memory instructs the processor to display the second-order data using a display device.

In another aspect, a method for higher-order growth modeling is disclosed. The method comprises receiving, using at least a processor, a growth constraint profile from a user. The method also includes generating, using the at least a processor, a plurality of strategy data as a function of the growth constraint profile, wherein the strategy data comprises a first strategy datum and a second strategy datum. The method includes. applying, using the at least a processor, the plurality of strategy data to the growth constraint profile using a growth simulation. The method includes predicting, using the at least a processor, growth data as a function of the application of the plurality of strategy data to the growth constraint profile. The method includes identifying, using the at least a processor, second-order data as a function of the growth data. The method includes displaying, using the at least a processor, the second-order data using a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for higher-order growth modeling is disclosed. The apparatus comprises at least a processor and a memory communicatively connected to the at least a processor. The memory instructs the processor to receive a growth constraint profile from a user. The memory instructs the processor to generate a plurality of strategy data as a function of the growth constraint profile, wherein the strategy data comprises a first strategy datum and a second strategy datum. The memory instructs the processor to apply the plurality of strategy data to the growth constraint profile using a growth simulation. The memory instructs the processor to predict growth data as a function of the application of the plurality of strategy data to the growth constraint profile. The memory instructs the processor to identify second-order data as a function of the growth data. The memory instructs the processor to display the second-order data using a display device.

Figure 1:
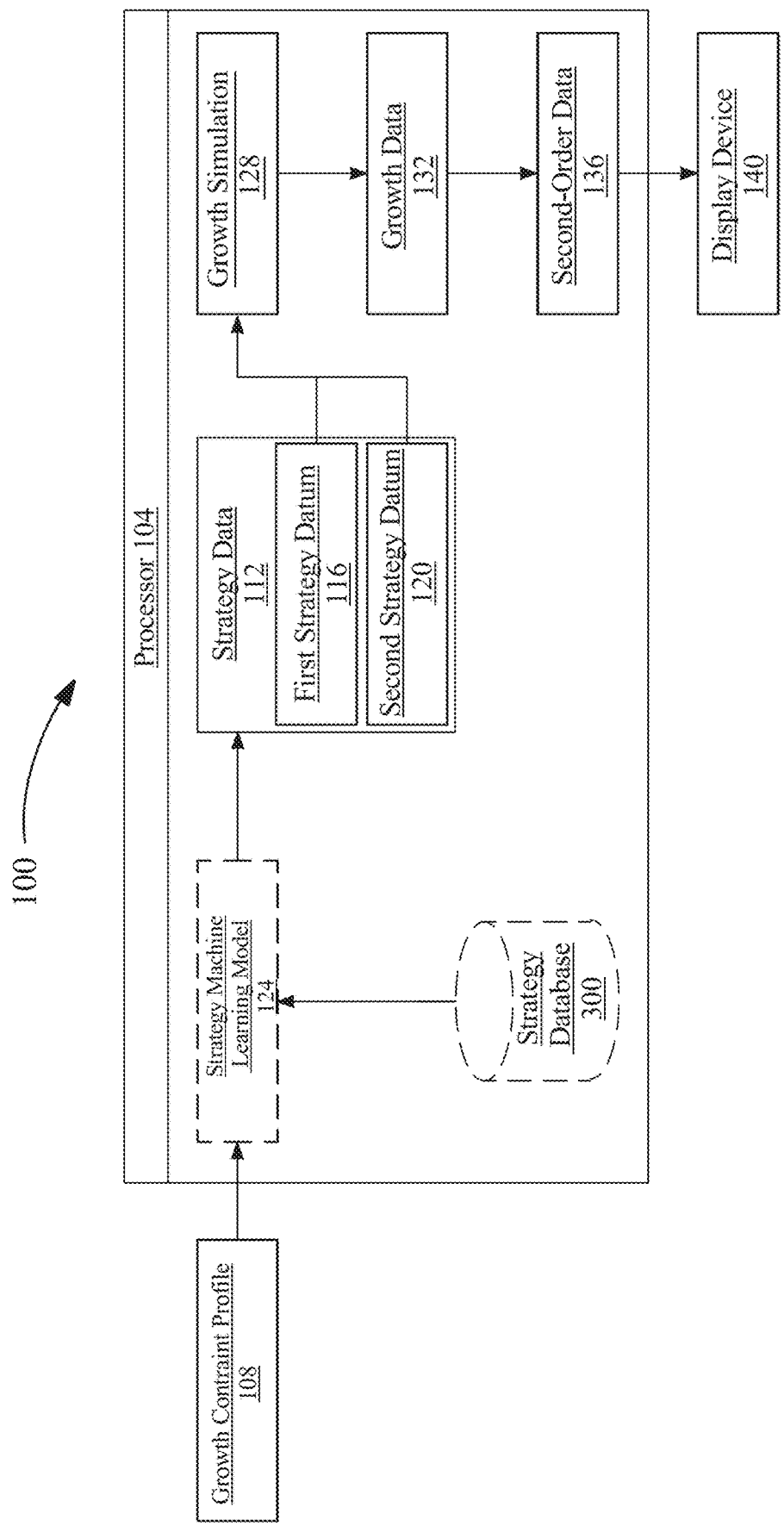
FIG. 1 is a block diagram of an exemplary embodiment of an apparatus for higher-order growth modeling.

Referring now to FIG. 1, an exemplary embodiment of apparatus 100 for higher-order growth modeling is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive a growth constraint 108 from a user. For the purposes of this disclosure, a "growth constraint profile" is a representation of information and/or data describing information associated with constraints governing growth, such as without limitation growth of an entity. A growth constraint profile 108 may be made up of a plurality of entity data. As used in the current disclosure, "entity data" is information associated with the entity. As used in the current disclosure, an "entity" is an organization comprised of one or more persons with a specific purpose. An entity may include a corporation, organization, business, group, and the like. A growth constraint profile 108 may be created by a processor 104, a user, or a third party. As used in the current disclosure, a "user" is an authoritative figure within the entity. The user may include a manager, owner, or shareholder of the entity. The growth constraint profile 108 may information regarding the entity's revenue, gross income, net income, business debts, a list of business expenses, current inventory, inventory history, sales information, human resource information, employee information, employee salaries, time cards, a list of company assets, a list of capital projects, accounting information, and the like.

With continued reference to FIG. 1, the growth constraint profile 108 may include any of the following personal information: age, height, gender, credit, geographical location, financial information, criminal history, medical history, and the like. A growth constraint profile 108 may include a listing of institutional problems and entity goals. As used in the current disclosure, a "entity goal" is a predetermined target that an entity or individual plans to achieve in a set period of time. These goals are often split into short-term goals and long-term goals. Entity goals can be general and high-level, or they can focus on specific measurable actions. Examples of entity goals may include but are not limited to financial goals, sales goals, identifying systematic inefficiencies, improvement of internal/external processes, infrastructure improvements, workforce improvements, and the like. As used in the current disclosure, an "institutional problem" is an issue that negatively impacts the entity. Alternatively, an institutional problem may be defined as a condition or issue that interferes with the achievement of an entity goal. In some embodiments, processor 104 may be configured to identify an institutional problem as a function of the growth constraint profile 108.

With continued reference to FIG. 1, a growth constraint profile 108 may be received by processor 104 via user input.

For example, and without limitation, the user or a third party may manually input growth constraint profile 108 using a graphical user interface of processor 104 or a remote device, such as for example, a smartphone or laptop. The growth constraint profile 108 may additionally be generated via the answer to a series of questions. The series of questions may be implemented using a chatbot, as described herein below. A chatbot may be configured to generate questions regarding any element of the growth constraint profile 108. In a non-limiting embodiment, a user may be prompted to input specific information or may fill out a questionnaire. In an embodiment, a graphical user interface may display a series of questions to prompt a user for information pertaining to the growth constraint profile 108. The growth constraint profile 108 may be transmitted to processor 104, such as via a wired or wireless communication, as previously discussed in this disclosure. The growth constraint profile 108 can be retrieved from multiple sources third-party sources including the user's inventory records, financial records, human resource records, past growth constraint profiles 108, sales records, user notes and observations, and the like. A growth constraint profile may be placed through an encryption process for security purposes.

With continued reference to FIG. 1, a growth constraint profile 108 may include entity records. As used in the current disclosure, an "entity record" is a document that contains information regarding the entity. Entity records may include employee credentials, reports, financial records, medical records, business records, Asset inventory, sales history, sales predictions, and government records (i.e. birth certificates, social security cards, and the like). An entity record may additionally include an employee record. An employee record may include things like employee evaluations, human resource records, client files, invoices, timecards, driver's license databases, news articles, social media profiles and/or posts, and the like. Entity records may be identified using a web crawler. Entity records may include a variety of types of "notes" entered over time by the user, employees of the user, support staff, advisors, and the like. Entity records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, growth constraint profile 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the growth constraint profile 108 and entity data. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract inventory records, financial records, human resource records, past growth constraint profiles 108, sales records, user notes, and observations, based on criteria such as a time period, business type, business location, products/services provided by a user, and the like.

With continued reference to FIG. 1, a growth constraint profile 108 may comprise a plurality of data regarding the growth constraints associated with the entity. "Growth constraint," as used herein refers to a barrier, limitation, consideration, or any other constraint pertaining to entity growth. Growth constraints may pertain to anything that is hindering the growth of the entity. Alternatively, a growth constraint may pertain to any barrier to accomplishing an entity goal. A growth constraint may include a lack of resources. A resource may include anything an entity uses to complete tasks, functions, or projects associated with the entity. Examples of growth constraints include but are not limited to monetary resources, time, equipment, personnel, services, products, goods, market factors, lack of clients, lack of tasks, and the like. A constraint may alter or limit the time and/or resources available to perform a task or it may alter the concurrent and/or sequential ordering of tasks in a function order, and/or may alter the feasibility of combining a plurality of tasks. Constraints may be generated using previous iterations of constraints faced by the current entity or entities that are similarly situated to the current entity. Constraints may refer to customer/user preferences. Such information may be stored and/or retrieved by a processor 104 from a database. A constraint may include qualifications and/or certifications related to an employee of the user. For example, a constraint to the use of a forklift may include: 1. An employee available to use the forklift and 2. That employee is certified to use the forklift.

With continued reference to FIG. 1., a processor 104 may identify growth constraints using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in a static program storage, calculated as part of a program's initialization phase or even stored in hardware in application-specific platforms. Data within the lookup table may include previous examples of growth constraints compared to entity data. Data within the lookup table may be received from database 300. Lookup tables may also be used to identify growth constraints by matching an input value to an output value by matching the input against a list of valid (or invalid) items in an array. In a non-limiting example, entity data may reflect that the entity has 5 employees who complete various tasks throughout the week. Examples of growth constraints may indicate that entities with the same number of employees and similar workflow suffer from a personnel-related growth constraint. A lookup table may look up the user's entity data as an input and output a growth constraint indicating that the entity's employees are inefficient. Processor 104 may be configured to "lookup" or input one or more growth constraint profile 108, entity data, and the like. Whereas the output of the lookup table may comprise a growth constraint. Data from the lookup table may be compared to examples of growth constraints, for instance, and without limitation using string comparisons, numerical comparisons such as subtraction operations, or the like. Alternatively or additionally, a query representing elements of entity data may be submitted to the lookup table and/or a database, and an associated growth constraint stored in a data record within the lookup table and/or database may be retrieved using the query.

With continued reference to FIG. 1, processor 104 may generate a plurality of strategy data 112 as a function of the growth constraint profile 108. As used in the current disclosure, "strategy data" is data related to a plan or process of achieving a goal by removing a growth constraint. Strategy data 112 may comprise the path between a starting point and an entity goal. Processor 104 may generate strategy data 112 by identifying a starting point and the desired entity goal. The starting point may be the current state of the entity data as it relates to the entity goal. In a non-limiting example, an entity goal may be to reach $10,000,000 in profit in a fiscal year. A starting point may comprise the business's profit in the last fiscal year. In another non-limiting example, an entity goal may be to sell 25% more of product A in the coming fiscal year. In the current example, a starting point may comprise the business's sales of product A in the last fiscal year.

With continued reference to FIG. 1, strategy data 112 may comprise a first strategy datum 116 and a second strategy datum 120. As used in the current disclosure, a "first strategy datum" is strategy data 112 related to at least one strategy category. As used in the current disclosure, a "second strategy datum" is strategy data 112 related to at least one strategy category. As used in the current disclosure, a "strategy category" is a type of strategy used to assist a user in getting from an initial point of accomplishing an entity goal. A strategy category may include an efficiency strategy, a human resource strategy, a management strategy, a service strategy, a marketing strategy, a market analysis strategy, and the like. In an embodiment, a first strategy datum may include an efficiency strategy while the second strategy datum comprises a human resource strategy. As used in the current disclosure, an "efficiency strategy" is a plan to achieve an entity goal that focuses on improving the efficiency of internal and external processes. This may include eliminating or altering any unnecessary, time-consuming, or resource-consuming steps within these processes. Efficiency may be compared to similarly situated businesses or processes. Strategy data 112 may indicate if a user needs to add or remove internal/external processes to facilitate the achievement of an entity goal. As used in the current disclosure, a "human resource strategy" is a plan to achieve an entity goal centered around human resource issues. This may include an evaluation of the business's employees and the job function of those employees. This may be done by evaluating the output or work product of each employee as compared to their industry peers. As used in the current disclosure, a "service strategy" is a plan to achieve an entity goal centered around an analysis of the products/services provided by the businesses. In an embodiment, a service strategy may include evaluating the market for the given product/service. A service strategy may additionally include an analysis of adjustments to the quality or price point of services/strategies that are offered by the user. In some embodiments, processor 104 may be configured to compare each strategy datum of the plurality of strategy data 112 to identify common themes. Common themes may include common personnel, equipment, timelines, strategy category, personnel traits, and the like.

With continued reference to FIG. 1, processor 104 may be configured to generate a time element associated with strategy data 112. As used in the current disclosure, a "time element" is a timeline for which an entity goal should be achieved. A time element may also be defined as the amount of time required to implement the strategy data 112. A time element may comprise a chronological time, event-driven time, or a combination of the two. In a non-limiting example, a user may be required to achieve their entity goal six months after an event occurs. Another non-limiting example of a time element may indicate that a user must accomplish Milestone A, then Milestone B, and Milestone C prior to achieving an entity goal. A time element may be generated from a combination of strategy data 112 and previous examples of time elements.

With continued reference to FIG. 1, processor 104 may be configured to generate a strategy score as a function of the strategy data 112. As used in the current disclosure, a "strategy score" is a scoring of the strategy data 112, wherein the score reflects the likelihood of success of the strategy data 112. A strategy score may reflect the likelihood that a given strategy data 112 will help a user accomplish an entity goal. A strategy score may also reflect the likelihood a user will accomplish an entity goal as a function of a given time element. A strategy score may be calculated using a numerical scale. A non-limiting example, of a numerical scale, may include a scale from 1-10, 1-100, 1-1000, and the like, wherein a rating of 1 may represent a less favorable chance of achieving an entity goal, whereas a rating of 10 may represent a highly favorable chance of achieving an entity goal. A strategy score may be generated from strategy data 112, entity goals, institutional problems, time elements, and the like. In a non-limiting example, a data fault rank may reflect the amount of the reduction compared to the degree of likelihood of a reduction of a medical bill. A strategy score may be generated using a machine learning model. The machine learning model may be trained using score training data. Score training data may include a plurality of data entries containing a plurality of inputs that are correlated to a plurality of outputs for training a processor by a machine-learning process to classify strategy data 112 to examples of a strategy score. Score training data may comprise data entries correlating strategy data 112 to examples of a strategy score. Score training data may be received from database 300. Score training data may contain information about growth constraint profile 108, strategy data 112, first strategy datum 116, second strategy datum 120, correlation data, examples of strategy scores, and the like. Score training data may additionally be generated from any historical versions of any data described herein.

With continued reference to FIG. 1, processor 104 may identify correlation data using a strategy machine-learning model 124. As used in the current disclosure, a "strategy machine-learning model" is a machine-learning model that sorts inputs into categories or bins of data, outputting the categories or bins of data and/or labels associated therewith. Strategy machine-learning model 124 may be consistent with the classifier described below in FIG. 2. Inputs to the strategy machine-learning model 124 may include a growth constraint profile 108, examples of strategy datum 112, and the like. Outputs to the strategy machine-learning model 124 may include correlation data. Strategy training data is a plurality of data entries containing a plurality of inputs that are correlated to a plurality of outputs for training a processor by a machine-learning process to correlate a growth constraint profile 108 to examples of strategy datum 112. Strategy training data may be received from database 300. Strategy training data may contain information about a growth constraint profile 108, examples of strategy datum 112, and the like. Strategy training data may correlate a growth constraint profile 108 to examples of strategy datum 112. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 is configured to apply the plurality of strategy data 112 to the growth constraint profile 108. Applying the plurality of strategy data 116 to the growth constraint profile 108 may include applying a first strategy datum 116 to the growth constraint profile 108 and/or applying a second strategy datum 120 to the growth constraint profile 108. Applying the strategy datum 112 to the growth constraint profile may include an implementation of the strategy data 112 on the growth constraint profile 108. Application of strategy data 112 may be used to identify if strategy data 112 will remove and/or modify the constraints faced by the entity. Processor 104 may be configured to select a first strategy datum 116 or a second strategy datum 120 as a function of a growth simulation 128. As used in the current disclosure, a "growth simulation" is a simulation of the performance of the user or the user business. A growth simulation may include a theoretical construct representing a variety of business processes by a set of variables and a set of logical and/or quantitative relationships between them. The simulation may be run multiple times to ensure accuracy, for instance and without limitation by randomizing parameters in a Monte Carlo simulation or the like. The results of the growth simulation may be charted. The growth simulation 128 may include a simplified framework designed to illustrate complex processes. Frequently, a growth simulation may posit several parameters, including personnel, resources, client management, and customer flow. A model may have various exogenous variables, and those variables may change to create various responses by economic variables. A growth simulation 128 may be configured to include investigation, theorizing, and fitting theories to the world. A growth simulation 128 may include an economic model, a stochastic model, a non-stochastic model, a qualitative model, and the like. A growth simulation 128 may be configured to simulate every aspect of a business, this may include inventory management, personnel management, customer management, finance management, facility management, and the like. A growth simulation 128 may be configured to apply a plurality of strategy data 112 to the growth constraint profile 108. In some embodiments, the application of the plurality of strategy data 112 may be used to identify if constraints faced by the entity were resolved or improved. In a non-limiting example, an entity may face growth constraint regarding a lack of available personnel. A growth model may be used to decide what is the correct strategy to resolve this growth constraints. A first strategy datum 116 may propose a strategy of hiring a new employee, while a second strategy datum 120 may propose building hiring a temporary contractor. A growth simulation 128 may be configured to simulate how the business will run for a given time a first strategy datum 116 or a second strategy datum 120 is implemented. A growth simulation 128 may be configured to simulate the decisions that are made by a business owner and the potential impact they would have over a given time. A growth simulation may simulate one or more aspects of a business over a given time. A growth simulation 128 may be used to determine growth data 132, correlation data, and/or strategy data 112. A growth simulation may be configured to generate updated entity data from a growth constraint profile 108 after performing the simulation. As used in the current disclosure, "updated entity data" is entity data taken from a growth constraint profile 108 after the application of strategy data 112. In a non-limiting example, a growth simulation may implement a first strategy datum 116 which comprises hiring a new employee. The growth simulation 128 may simulate the work output of the new employee over a given time. The output of the employee may be reflected in updated entity data, wherein the updated entity data reflects that the personnel of the company are 7% more productive since adding the new employee. In some embodiments, a growth simulation 128 may be used to identify commonalities between multiple strategies represented by the strategy data 112. Examples of commonalities may include similar personnel, personnel traits, equipment, problems, growth, efficiency, cost, lead time, and the like that are associated with each strategy datum of the plurality of strategy data 112.

With continued reference to FIG. 1, processor 104 may generate a growth simulation 128 using a simulation machine-learning model. As used in the current disclosure, a "simulation machine-learning model" is a machine-learning model that sorts inputs into categories or bins of data, outputting the categories or bins of data and/or labels associated therewith. The simulation machine-learning model may be consistent with the classifier described below in FIG. 2. Inputs to the simulation machine-learning model may include a growth constraint profile 108, first strategy datum 116, second strategy datum 120, correlation data, examples of growth simulations and the like. Outputs to the simulation machine-learning model may include a growth simulation 128 tailored to the growth constraint profile. Simulation training data is a plurality of data entries containing a plurality of inputs that are correlated to a plurality of outputs for training a processor by a machine-learning process to correlate strategy data 112 to examples of growth simulations. Simulation training data may be received from database 300. Simulation training data may contain information about a growth constraint profile 108, first strategy datum 116, second strategy datum 120, correlation data, examples of growth simulations 128, and the like. Simulation training data may correlate a first strategy datum 116 and a second strategy datum 120 to examples of growth simulation. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be configured to identify correlation data as a function of the plurality of strategy data 112. As used in the current disclosure, "correlation data" is data regarding the comparison of a plurality of strategy data 112. Correlation data may additionally include a comparison of the effectiveness of a first strategy datum 116 to a second strategy datum 120. In embodiments, this comparison may be done by comparing the outputs of the growth simulation. Processor 104 may generate correlation data by comparing various aspects of a first and second strategy datum. This may include a comparison of the financial commitment, time commitment, time elements, the likelihood of success, cost-benefit analysis, and the like. A comparison of the financial commitment may include a comparison of how much money and/or resources are needed to implement strategy data 112. In a non-limiting example, a first strategy datum 116 may indicate a strategy centered around hiring a new employee who specializes in the given institutional problem. A second strategy datum 120 may be a strategy centered around lowering the price point around the goods/services that are provided by the user's business. The cost of hiring the employee may be $105,000 annually while the reduction in the price of the goods/services will cost $200,000 annually. A correlation datum may compare the financial commitment of both strategies and determine that hiring the employee will be more cost-effective. In another non-limiting example, a growth constraint profile 108 may indicate that a user has an entity goal of increasing the productivity of their employees by 15%. Processor 104 may identify a first strategy datum 116 comprising a management strategy of implementing a bonus program attached to the productivity goals of the employees. Processor 104 subsequently identifies a second strategy datum 120 comprising an efficiency strategy of purchasing new tools for the employees, wherein the new tools are used to reduce the time an employee spends on a given task. Correlation data may be configured to compare the time element associated with both the first and the second strategy data. A simulation may show that the first strategy datum 116 may have a time element of 90 days, while the second strategy datum 120 has a time element of six months due to training requirements. In an embodiment, correlation data may compare the effectiveness of a first strategy datum 116 to the effectiveness of a second strategy data 120. In some embodiments, a comparison may be done using forecast models, as discussed in greater detail herein below. A correlation datum may compare the strategy categories of strategy data 112. A correlation datum may comprise the similarities between a plurality of strategy data 112.

With continued reference to FIG. 1, processor 104 may identify correlation data using a correlation machine-learning model. As used in the current disclosure, a "correlation machine-learning model" is a machine-learning model that sorts inputs into categories or bins of data, outputting the categories or bins of data and/or labels associated therewith. Correlation machine-learning model may be consistent with the classifier described below in FIG. 2. Inputs to the correlation machine-learning model may include a growth constraint profile 108, strategy data 112, first strategy datum 116, second strategy datum 120, output of a growth simulation, examples of correlation data, and the like. Outputs to the correlation machine-learning model may include correlation data. Correlation training data is a plurality of data entries containing a plurality of inputs that are correlated to a plurality of outputs for training a processor by a machine-learning process to correlate a first strategy datum 116 and a second strategy datum 120 to examples of correlation data. Correlation training data may be received from database 300. Correlation training data may contain information about a growth constraint profile 108, strategy data 112, first strategy datum 116, second strategy datum 120, output of a growth simulation, examples of correlation data, and the like. Correlation training data may correlate a first strategy datum 116 and a second strategy datum 120 to examples of correlation data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, a machine-learning model, such as strategy machine-learning model, may be implemented as a fuzzy inferencing system. As used in the current disclosure, a "fuzzy inference" is a method that interprets the values in the input vector (i.e., a plurality of strategy data 112 and examples of correlation data.) and, based on a set of rules, assigns values to the output vector. A set of fuzzy rules may include a collection of linguistic variables that describe how the system should make a decision regarding classifying an input or controlling an output. An example of linguistic variables may include variables that represent one or more correlation data. Examples of linguistic variables may include terms such as a "low likelihood of success, "moderate likelihood of success," and "high likelihood of success." In some embodiments, a linguistic variable may comprise a selection of a strategy datum 112 from a plurality of strategy data 112 as a function of correlation data. In this case, linguistic variables may represent a "first strategy datum" or a "second strategy datum." A first strategy datum 116 and a second strategy datum 120 may each individually represent a fuzzy set. Additionally, an example of correlation data may also represent a fuzzy set. The correlation data may be determined by a comparison of the degree of match between a first fuzzy set and a third fuzzy set and a second fuzzy set and a third fuzzy set, and/or single values therein with each other or with either set, which is sufficient for purposes of the matching process.

Still referring to FIG. 1, the correlation data may be determined as a function of the intersection between two fuzzy sets. Ranking the correlation data may include utilizing a fuzzy set inference system as described herein below, or any scoring methods as described throughout this disclosure. For example, without limitation processor 104 may use a fuzzy logic model to determine correlation data as a function of fuzzy set comparison techniques as described in this disclosure. In some embodiments, each piece of information associated with a plurality of strategy data 112 (i.e. a first strategy datum 116 and a second strategy datum 120) may be compared to one or more examples of an correlation data, wherein correlation data may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare a first strategy datum 116 and a second strategy datum 120 with a goal of generating a correlation datum. This may be done by individually comparing a first strategy datum 116 to an example of a correlation datum, then repeating this process for a second strategy datum 120. The degree of overlap between all four of these fuzzy sets may be compared to identify a correlation datum. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

Still referring to FIG. 1, the processor may be configured to generate a machine-learning model, such as correlation machine-learning model, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as correlation machine-learning model, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

With continued reference to FIG. 1, processor 104 may be configured to determine growth data 132 as a function of the correlation data. "Growth data" as described herein is data relating to the progression toward a goal relating to growth, such as without limitation progression of a user towards an entity goal, as a function of the application of the strategy data 112 to the growth constraint profile 108. In some embodiments, Growth data 132 may be generated as a function of correlation data. For example, growth data 132 may include the progress of a user or a user's business over time, such as for example, an increase in sales of a business over a given period of time. Growth data 132 may be used to track the progress of entity data following the implementation of a growth data 132. In some embodiments, growth data 132 may include data related to improvement or progression of entity goals based on strategy data 112 for instance, and without limitation, increased scores on an assessment, completion of more difficult tasks, mastery of more complex skills, and the like. Growth data 132 may additionally reflect a change in the entity data from the starting point until the current time. Growth data 132 may further include a list of instructions to improve a specific element of entity data. In some cases, growth data 132 may further include profile modification data wherein "profile modification data" includes data on how to modify a growth constraint profile 108. In some embodiments, growth data 132 may be plotted graphical manner as function of time. In some embodiments, each growth category of the plurality of growth categories may be plotted. A "growth category," as used in the current disclosure, is a category for the entity that has shown growth. Examples of growth categories may include market share, revenue, profit, inventory, number of employee, infrastructure, distribution, number of vendors, number of client, average sales to clients, client sales history, service price point, product price point, manhours consumed by the business, maintenance considerations, number of facilities, and the like.

With continued reference to FIG. 1, growth data 132 may include a growth score, wherein the growth score is data indicating the change in entity data or growth constraint profile 108. Growth score may indicate how well a particular user has improved as function entity goal or strategy data 112. A growth score may include a numerical score such as a score of 1-100 wherein 1 may signify that a user has had little improvement from an initial point to the current point and a higher score may signify that a user had significant improvement from the initial point. A growth score may additionally be calculated as a function of a time element. In a non-limiting example, a time element provides that strategy data 112 would take six months to implement. A growth score taken at the three-month mark may be adjusted to fit the milestones or subgoals of the three month mark.

With continued reference to FIG. 1, generating growth data 132 may include receiving growth data 132 from a growth constraint profile 108. A user may input growth data 132 indicating the growth that was achieved since the action or event. Growth data 132 may further be generated through a smart assessment wherein a user may score themselves, and answer questions and the like related to their growth in a particular area. Growth data 132 may be extracted from a growth constraint profile 108 using a chatbot, OCR, or a WebCrawler as described throughout this application. A processor 104 may additionally be configured to generate growth data 132 by comparing the current state of the entity data or growth constraint profile 108 to previous iterations of the entity data and growth constraint profile 108. Strategy data 112 or an entity goal may be used to identify the specific areas in which a user should be improving and In some cases, growth data 132 may be generated as a function of user experience data 108 wherein growth data 132 is generated using a machine learning model as described in this disclosure. In some cases, growth data 132 may be generated using any algorithm as described in this disclosure.

With continued reference to FIG. 1, processor 104 may generate growth data 132 using a growth machine-learning model. As used in the current disclosure, a "growth machine-learning model" is a machine-learning model that sorts inputs into categories or bins of data, outputting the categories or bins of data and/or labels associated therewith. Growth machine-learning model may be consistent with the classifier described below in FIG. 2. Inputs to the growth machine-learning model may include a growth constraint profile 108, strategy data 112, first strategy datum 116, second strategy datum 120, a growth simulation 128, correlation data, examples of growth data 132, and the like. Outputs to the growth machine-learning model may include growth data 132. Growth training data is a plurality of data entries containing a plurality of inputs that are correlated to a plurality of outputs for training a processor by a machine-learning process to correlate a growth simulation 128 to examples of growth data 132. Growth training data may be received from database 300. Growth training data may contain information about a growth constraint profile 108, strategy data 112, first strategy datum 116, second strategy datum 120, a growth simulation 124, correlation data, examples of growth data 132, and the like. Growth training data may correlate a growth simulation 128 to examples of growth data 132. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor and/or a growth machine learning model may be used to find a "best fit" differentiable and/or piecewise differentiable curve to describe projected growth. For instance, and without limitation, processor and/or a growth machine-learning model may be configured to identify a plurality of polynomial splines that connect the projected growth data 132 when it is plotted graphically. Polynomial splines, such as without limitation cubic splines, may connect projected growth data 132 points in sequence. These growth data 132 points and the polynomial splines that represent them may have differentials that are minimally different, or the same within some small threshold value, at the points of connection. Differentiation of the polynomial splines may be done using a machine learning model or any other method described herein. Polynomials splines can be used to approximate complicated curves that may represent any growth data 132 that occurs between the plotted growth data 132 points. In a non-limiting example, processor 104 may identify several growth data 132 points over a period of time. Then processor 104 may generate one or more polynomial splines to fit a curve between a plurality of growth data 132 points using a machine-learning model. A growth machine learning model may be used to polynomials to small subsets of the values, for example, fitting nine cubic polynomials between each pair of ten growth data 132 points, instead of fitting a single polynomial to all of them. In some embodiments, the identified polynomial spline may be displayed using user interface 800. Spline interpolation is often preferred over polynomial interpolation because the interpolation error can be made small even when using low-degree polynomials for the spline.

With continued reference to FIG. 1, processor 104 may be configured to generate an application plan as a function of a growth simulation. As used in the current disclosure, an "application plan" is a set of instructions for the implementation of strategy data 112. An application plan may be generated as a function of a growth simulation or goal data 132. An application plan may include a plurality of instructions regarding how to implement strategy data 112. In an embodiment, an application plan may be generated as a function of the identification of the entity goal and strategy data 112. An application plan may be a strategy data 112 broken down into a series of sub-goals. In some embodiments, the sub-goals may be smaller or more simple goals used to progress the user toward an entity goal. For example, if processor 104 identifies strategy data 112 that identifies that a new facility will help the user achieve their entity goals. A non-limiting example of an application plan for purchasing a new facility may be: 1. Conducting an evaluation of the financial situation; 2. Identifying a price point for the facility; 3. Identify a location for the facility; 4. Identify a facility for sale within the price range. Additionally, an application plan may be comprised of a plurality of steps and sub-steps. A step may comprise a task that a user must complete in order to achieve further strategy data 112. Once a user has achieved a plurality of steps and subs steps the user may achieve a waypoint. In embodiments, an application plan may be comprised of a set of waypoints. As used in the current disclosure, a "waypoint" is a milestone for accomplishing an entity goal. A non-limiting example of a waypoint may be saving 20% of the total cost of a facility for a down payment, in reference to the above example. As used in the current disclosure, a "milestone" is an event marking a significant change or progress for the user achieving an entity goal.

With continued reference to FIG. 1, processor 104 may identify second-order data 136 as a function of the application of the growth data 132. As used in the current disclosure, "second-order data" is data related to a second-order latent growth curve generated as function of the growth data 132. Second-order data 136 may include a second-order growth curve generated as a function of the growth data 132 plotted over time. Second order data 136 may additionally compare any information associated with the second-order growth curve. Processor 104 may generate the second-order growth curve using a plurality of growth data 132. Second-order data 136 may additionally comprise the slope of a curve at any given time. The slope of the second-order growth curve may be reflected as a tangent line to the curve. In other embodiments, processor 104 may be configured to identify a formula representing the curve, then identify the slope the curve by taking the derivative of the formula. The estimation of latent variables at each time point, which separately estimates measurement error (specific variance), may not impact mean slope estimates, because means are unbiased by measurement error. Having multiple indicators at each time point, however, will increase growth curve reliability and therefore increase statistical precision and increase power. A second order latent growth curve may be used to estimate change based on multiple observed variables. The variables in this case may include the application of the points of growth data 132 overtime. The second-order latent growth curve may be generated using latent growth modeling. Latent growth modeling is a statistical technique used in the structural equation modeling (SEM) or framework to estimate growth trajectories. It is a longitudinal analysis technique to estimate growth over a period of time. This may be done using a modeling machine learning model as mentioned in greater detail herein below. Processor 104 may generate a second-order latent growth curve plotting a plurality of growth data 132 over time. The plurality of growth data 132 may be related to several aspects of growth of the entity, this may include income, sales, number of employees, number of equipment, market share, turnaround time, and the like. Second-order data may be accomplished by differentiating a curve representing growth, and/or by approximating such differentiation using, e.g., a piece-wise approximation of a limit used to compute a differential, such as reducing h in the expression $$\lim_{h \to 0} \left( \frac{\hat{f}(t) - \hat{f}(t+h)}{h} \right),$$

where $\hat{f}(t)$ is a section of curve fitted to projected and/or recorded growth numbers, and t represents time.

With continued reference to FIG. 1, processor 104 may generate a second-order growth curve as a function of growth data 132 using a second-order machine-learning model. As used in the current disclosure, a "second-order machine-learning model" is a machine-learning model that sorts inputs into categories or bins of data, outputting the categories or bins of data and/or labels associated therewith. Second-order machine-learning model may be consistent with the classifier described below in FIG. 2. Inputs to the second-order machine-learning model may include a growth constraint profile 108, strategy data 112, first strategy datum 116, second strategy datum 120, a growth simulation 124, correlation data, growth data 132, examples of second-order growth curves, and the like. Outputs to the growth machine-learning model may include a second-order growth curve tailored to the growth data 132. Second-order training data is a plurality of data entries containing a plurality of inputs that are correlated to a plurality of outputs for training a processor by a machine-learning process to correlate growth data 132 to examples of a Second-order growth curve. Growth training data may be received from database 300. Growth training data may contain information about a growth constraint profile 108, strategy data 112, first strategy datum 116, second strategy datum 120, a growth simulation 124, correlation data, growth data 132, examples of second-order growth curves, and the like. Growth training data may correlate growth data 132 to examples of a second-order growth curve. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to display the growth data 132 using a display device 140. As used in the current disclosure, a "display device" is a device that is used to display a content processor 104. A display device 140 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
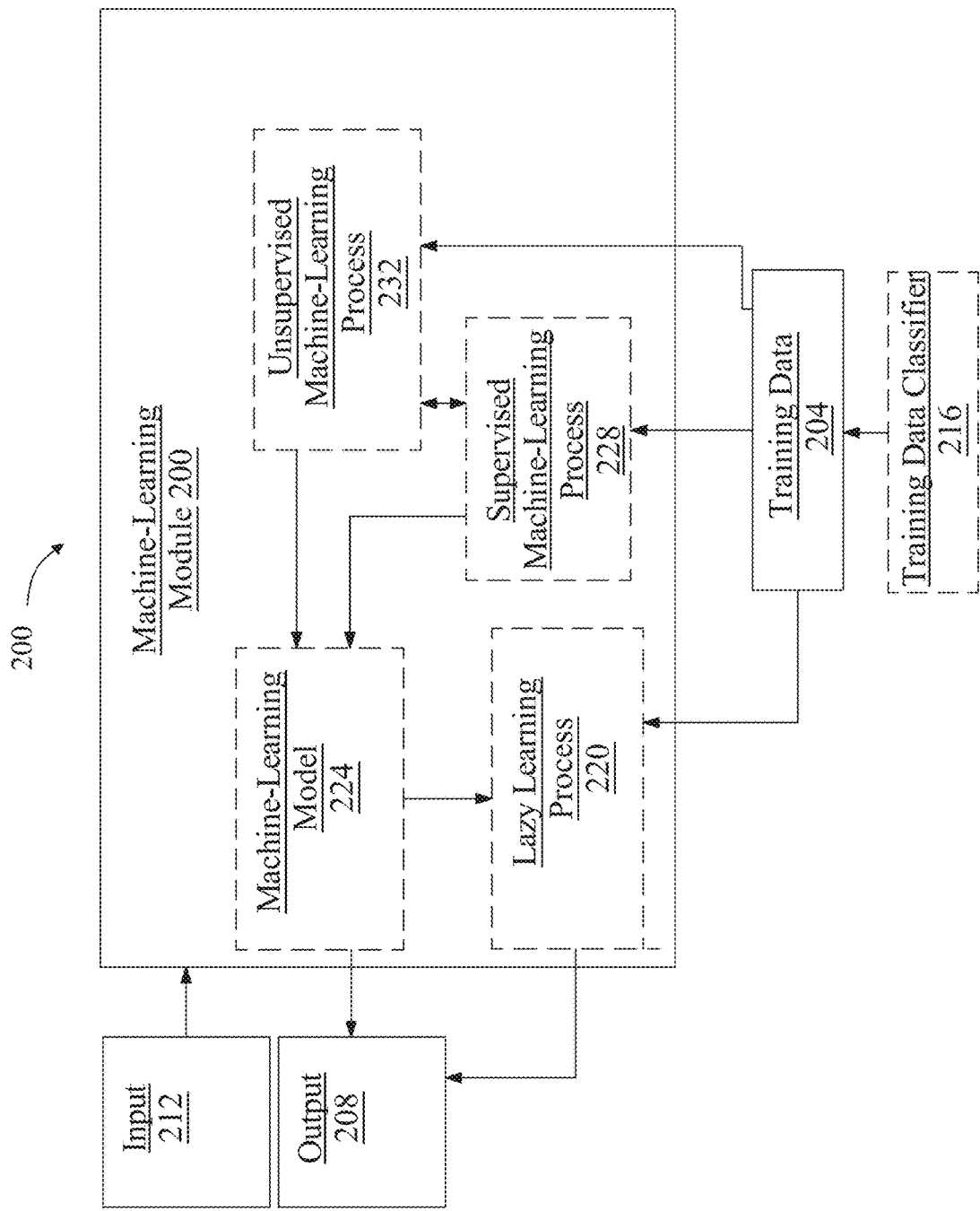
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning modules may perform determinations, classification, and/or analysis steps, methods, processes, or the like as described in this disclosure using machine-learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
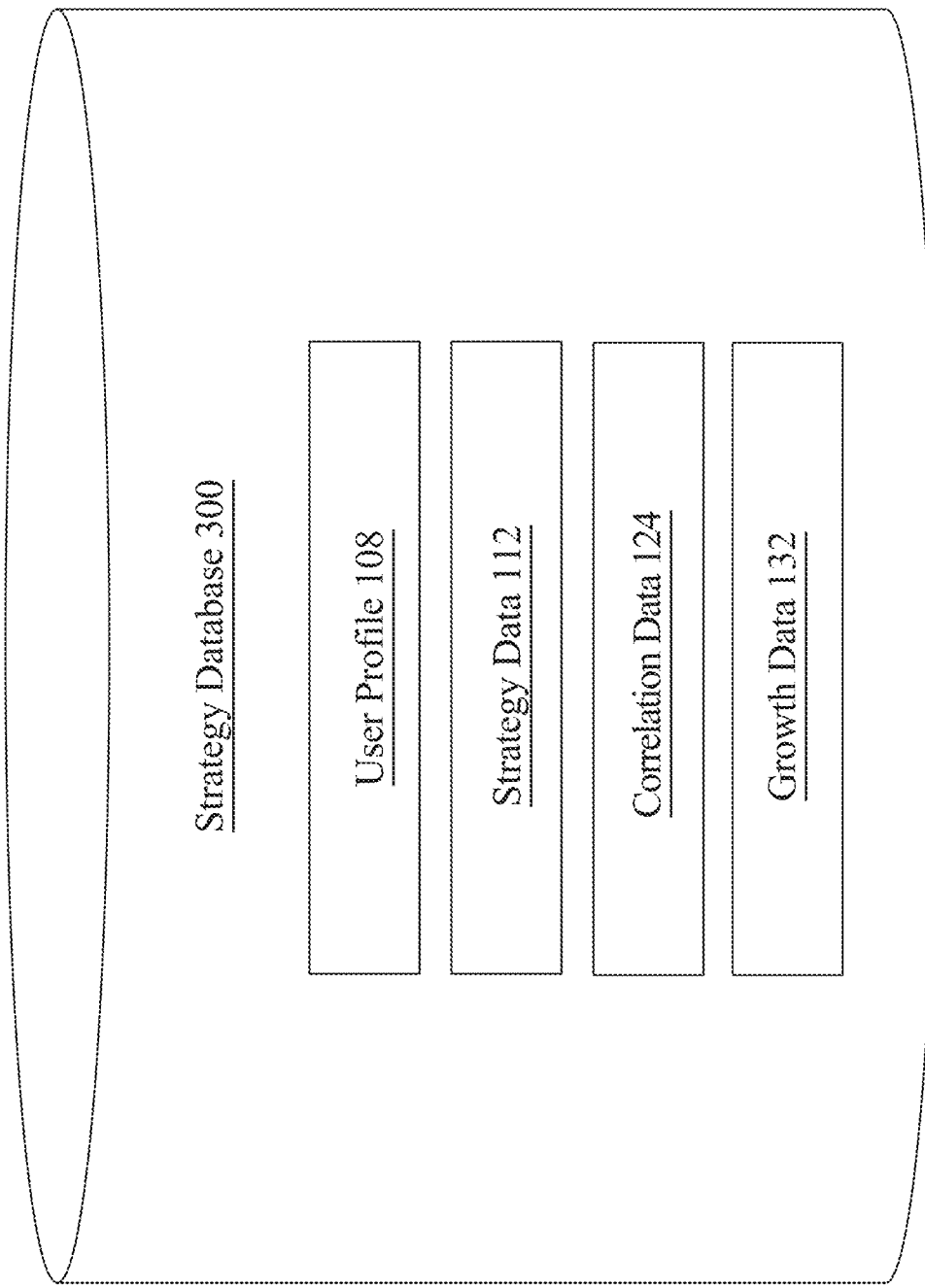
FIG. 3 is a block diagram of an exemplary embodiment of a strategy database.

Now referring to FIG. 3, an exemplary strategy database 300 is illustrated by way of block diagram. In an embodiment, any past or present versions of data disclosed herein may be stored within growth constraint profile 108, strategy data 112, first strategy datum 116, second strategy datum 120, correlation data, growth data 132, and the like. Processor 104 may be communicatively connected with strategy database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Strategy database 300 may be implemented, without limitation, as a relational database, a key-value retrieval database such as a NOSQL database, or any other format or structure for use as a database that a person skilled in the art would recognize as suitable upon review of the entirety of this disclosure. Strategy database 300 may alternatively or additionally be implemented using a distributed data storage protocol and/or data structure, such as a distributed hash table or the like. Strategy database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
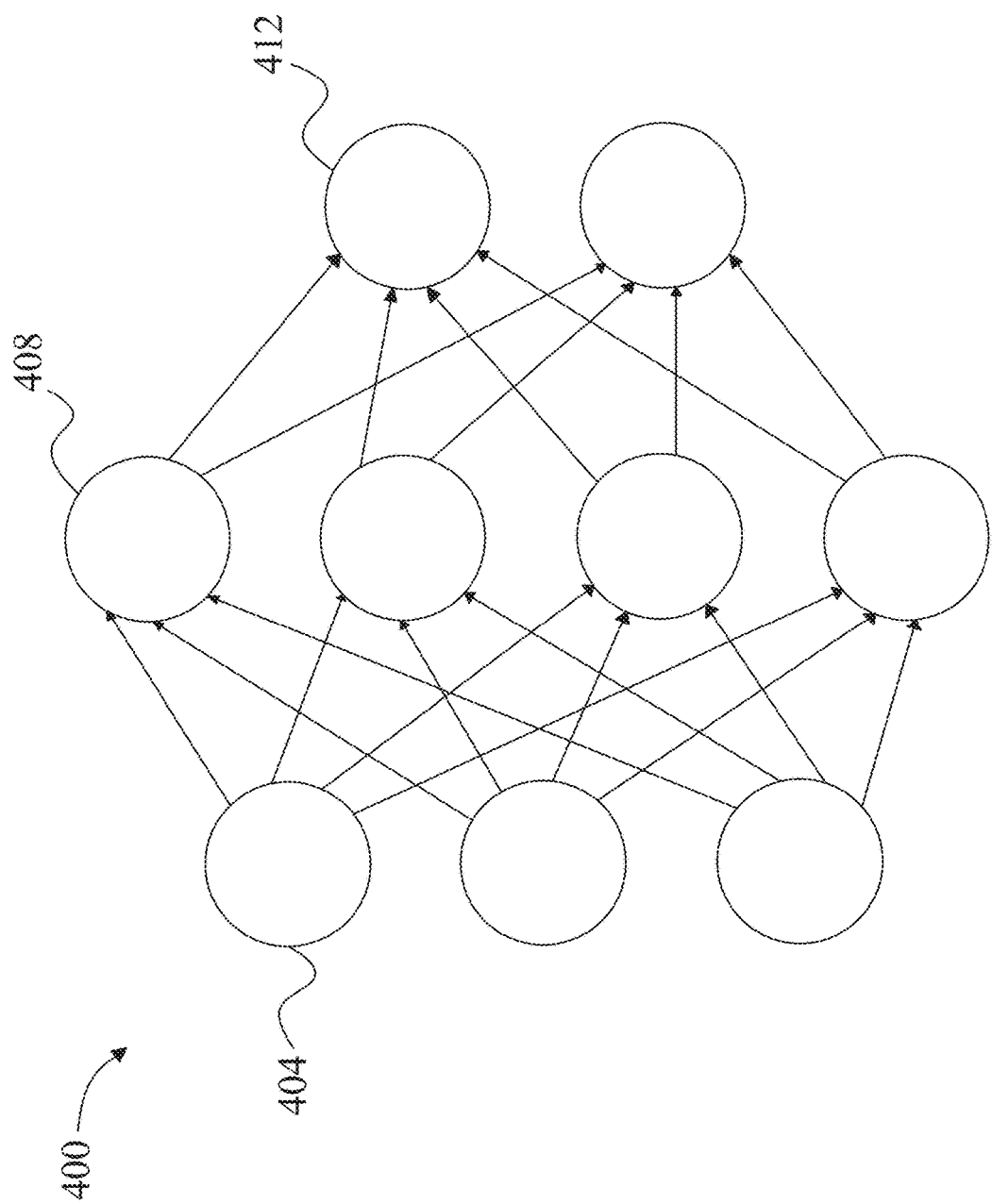
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
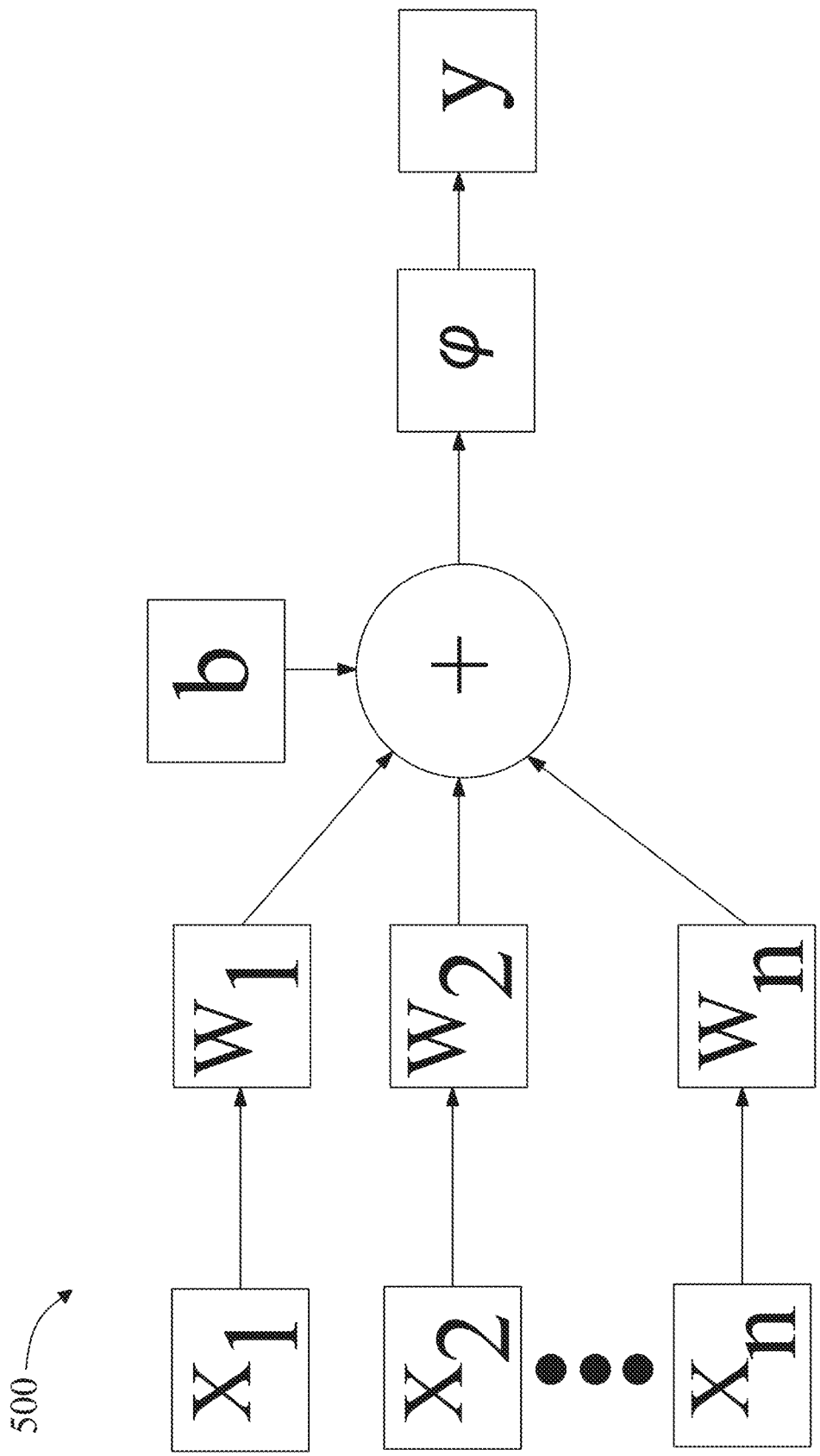
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w'_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$, applied to an input $x_i$ may indicate whether the input is "excitatory," indicating that it has strong influence on the one or more outputs y, for instance by the corresponding weight having a large numerical value, and/or an "inhibitory," indicating it has a weak effect influence on the one more inputs y, for instance by the corresponding weight having a small numerical value. The values of weights $w'_i$ may be determined by training a neural network using training data, which may be performed using any suitable process as described above.

Figure 6:
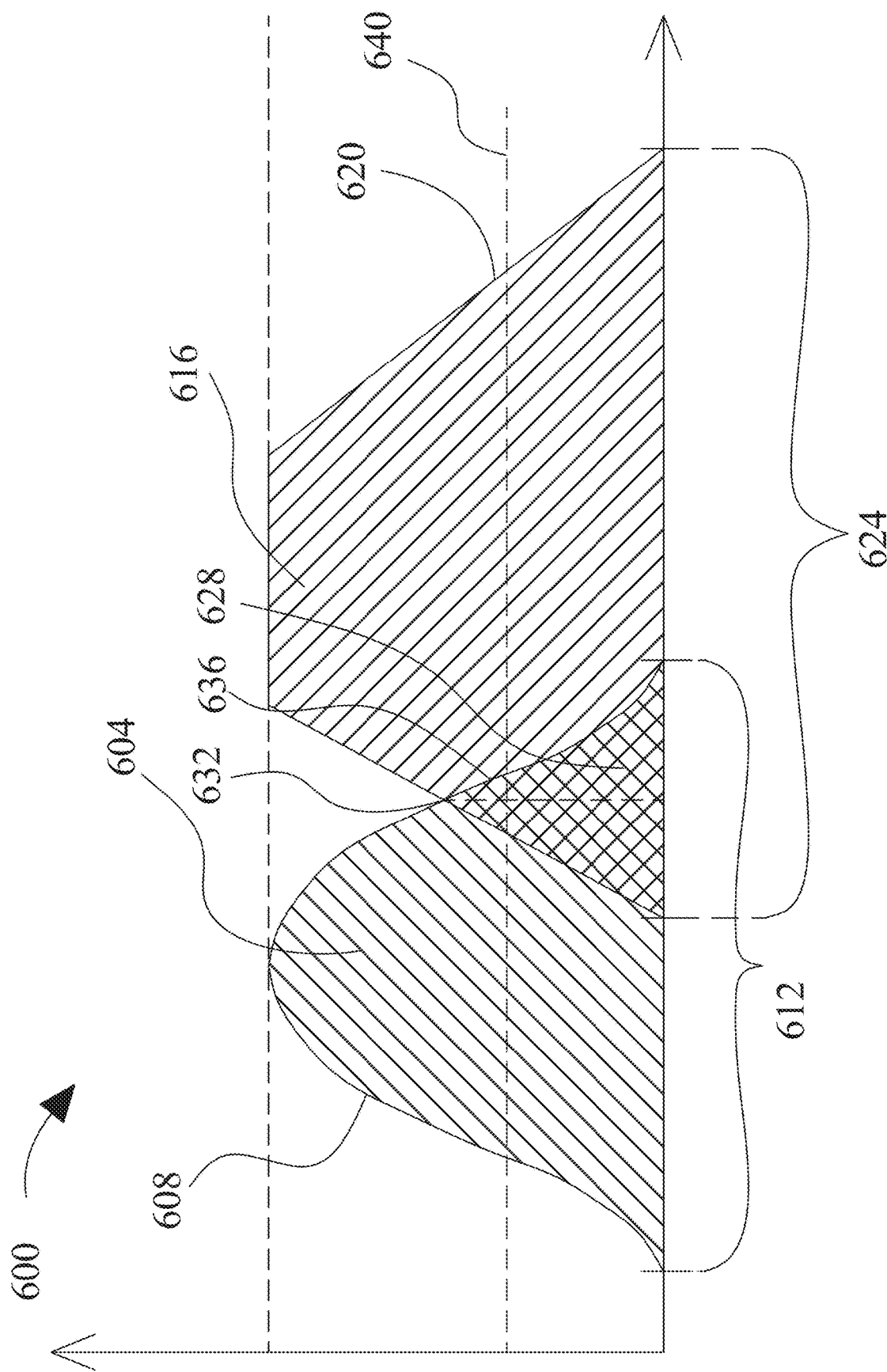
FIG. 6 is an illustration exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a plurality of strategy data 112 (i.e. a first strategy datum 116 and a second strategy datum 120) and an example of a correlation datum from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input a plurality of strategy data 112 and an example of correlation data. For instance, an acceptance variable may represent a first measurable value pertaining to the classification of a plurality of strategy data 112 to an example of correlation data. Continuing the example, an output variable may represent correlation data tailored to the comparison of a first strategy datum 116 to a second strategy datum 120. In an embodiment, a plurality of strategy data 112 and/or an example of correlation data may be represented by their own fuzzy set. In other embodiments, an evaluation factor may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any a plurality of strategy data 112 and an example of correlation data. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, a correlation datum may indicate a sufficient degree of overlap with fuzzy set representing a plurality of strategy data 112 and an example of correlation data for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a plurality of strategy data 112 and an example of correlation data have fuzzy sets, correlation data may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
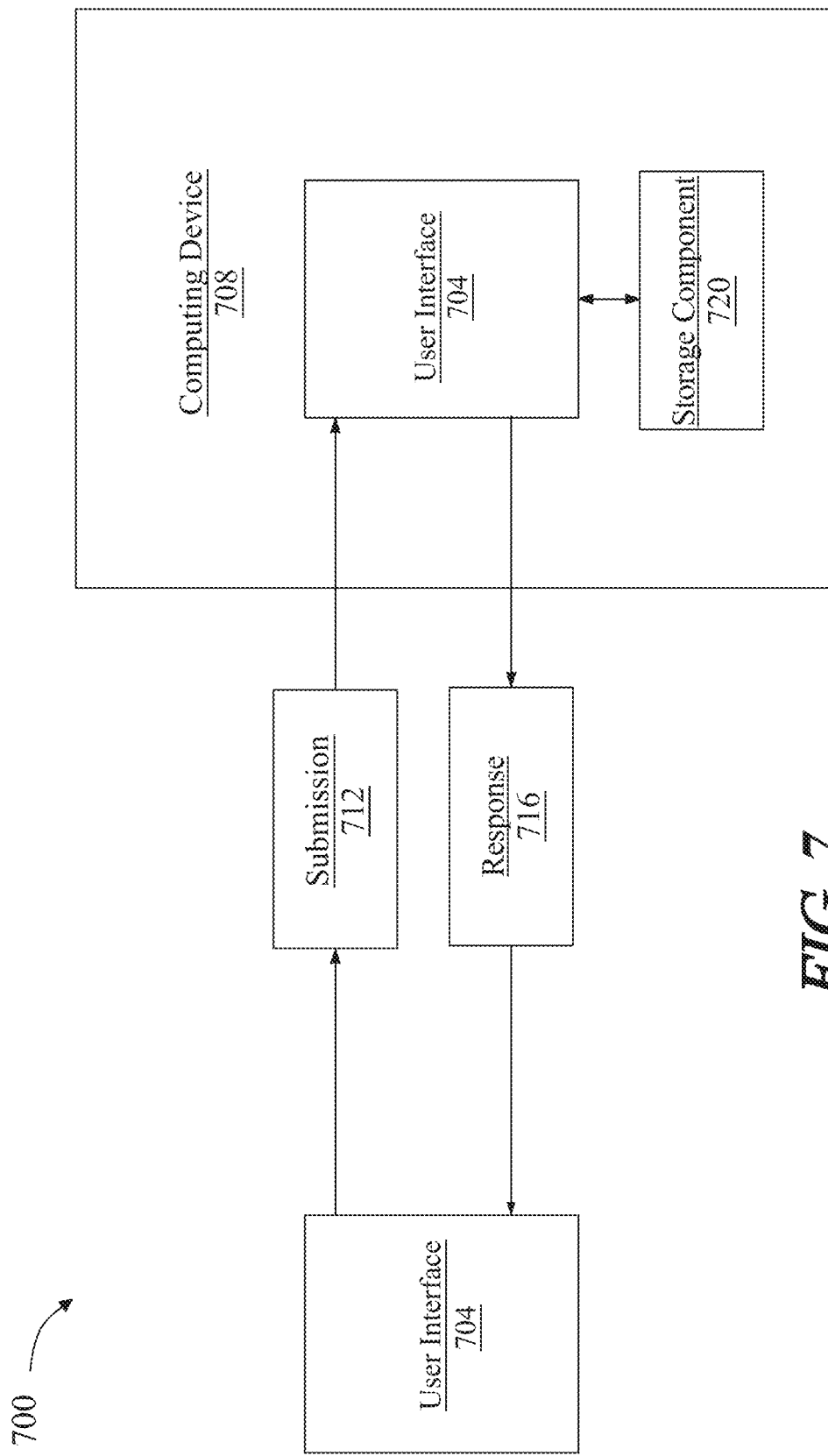
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor may process a submission 712 using one or more of keyword recognition, pattern matching, and natural language processing. In some embodiments, processor may employ real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs into a chatbot as a response to a prompt or question.

With continuing reference to FIG. 7, computing device 708 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
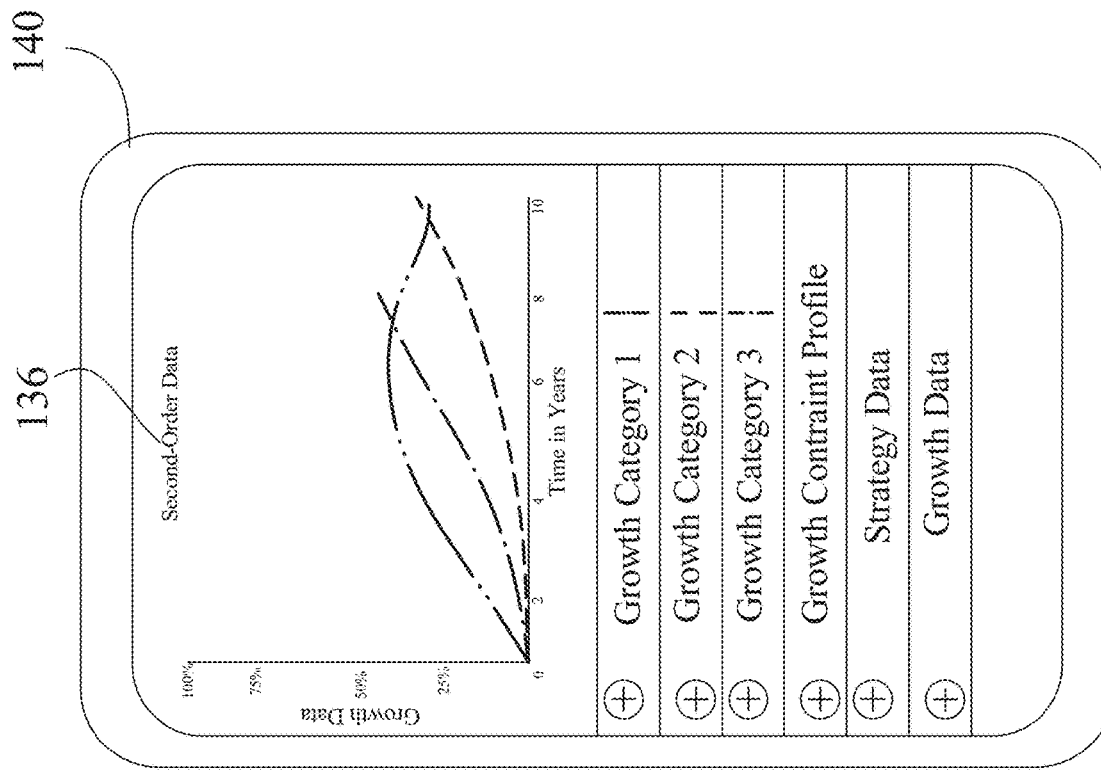
FIG. 8 is an illustration of an exemplary of a user interface.

Now referring to FIG. 8, an exemplary representation of a user interface component is presented. User interface 800 may include a display device such as display device 140. In an embodiment, user interface 800 may display second-order data 136, which may include a graphical representation of growth data 132. In an embodiment, user interface 800 may display a detailed account of how the growth data 132 is generated and a breakdown of the second-order data 136. As the growth data 132 changes the second-order data 136 that is displayed by user interface 800 will change. In some embodiments, user interface 800 may display an identification of trends that are identified by the second order curve. A second-order growth curve may be changed as the growth data changes. Additionally, user interface 800 may be used to display a growth simulation 124 or a plurality of strategy data 112. A use interface 800 may additionally provide a user an option to select one strategy data 112 of a plurality of strategy data to implement.

Figure 9:
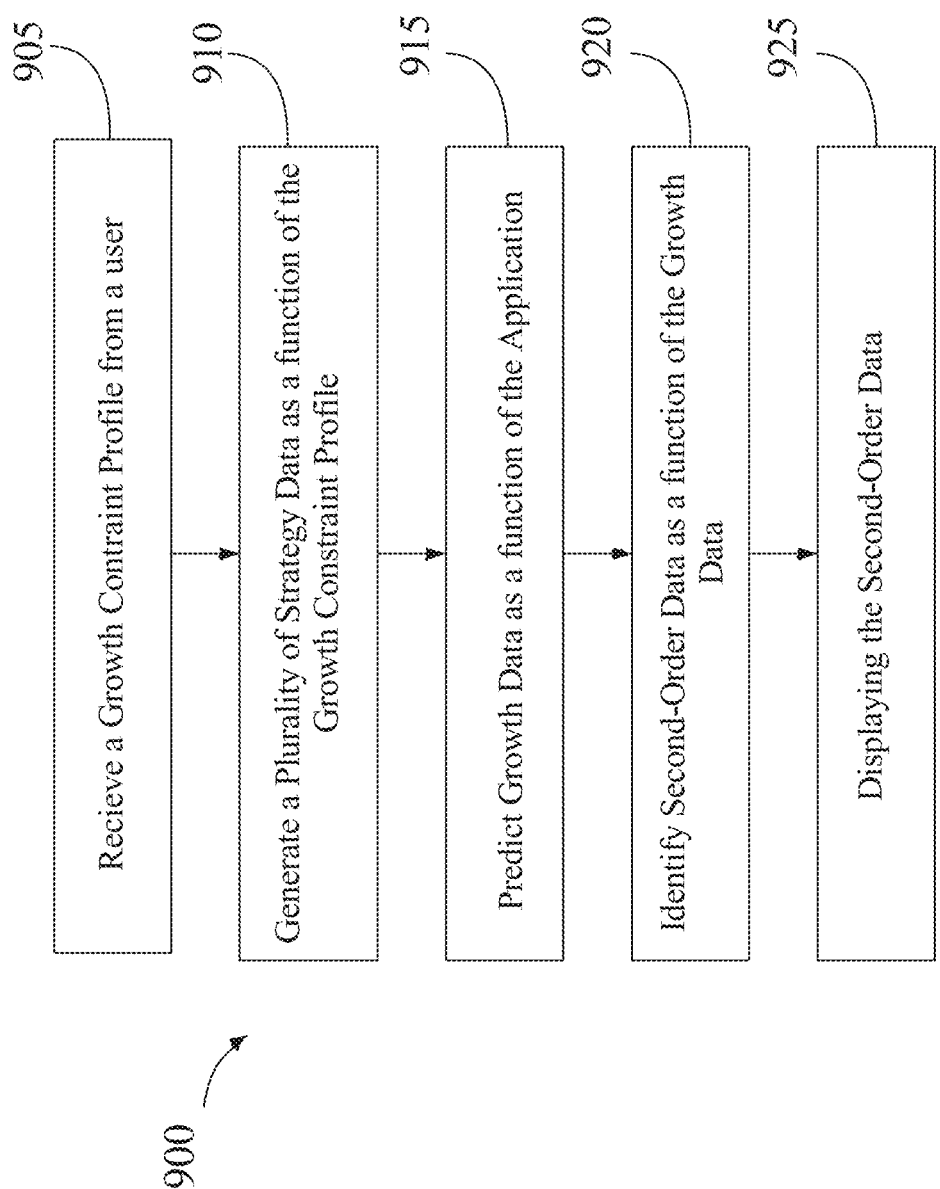
FIG. 9 is a flow diagram of an exemplary method for higher-order growth modeling.

Referring now to FIG. 9, a flow diagram of an exemplary method 900 for higher-order growth modeling is illustrated. At step 905, method 900 includes receiving, using at least a processor, a growth constraint profile from a user. This may be implemented as described and with reference to FIGS. 1-9. In some embodiments, extracting the growth constraint profile may comprise extracting the growth constraint profile using a WebCrawler or a chatbot.

Still referring to FIG. 9, At step 910, method 900 includes generating, using the at least a processor, a plurality of strategy data as a function of the growth constraint profile, wherein the strategy data comprises a first strategy datum and a second strategy datum. This may be implemented as described and with reference to FIGS. 1-9. In some embodiment, generating the plurality of strategy data may comprise generating the plurality of strategy data using a strategy machine learning model. In other embodiments, generating the plurality of strategy data using the strategy machine learning model may comprise training the strategy machine learning model using strategy training data, wherein the strategy training data contains a plurality of data entries containing the growth constraint profile as inputs correlated to the plurality of strategy data as outputs and generating a plurality of strategy data as a function of the growth constraint profile using the strategy machine learning model.

Still referring to FIG. 9, At step 915, method 900 includes applying, using the at least a processor, the plurality of strategy data to the growth constraint profile using a growth simulation, wherein the application of the plurality of strategy data comprises. This may be implemented as described and with reference to FIGS. 1-9.

Still referring to FIG. 9, At step 920, method 900 comprises predicting, using the at least a processor, growth data as a function of the application of the plurality of strategy data to the growth constraint profile. This may be implemented as described and with reference to FIGS. 1-9.

Still referring to FIG. 9, At step 925, method 900 comprises displaying, using the at least a processor, the second-order data using a display device. This may be implemented as described and with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Figure 10:
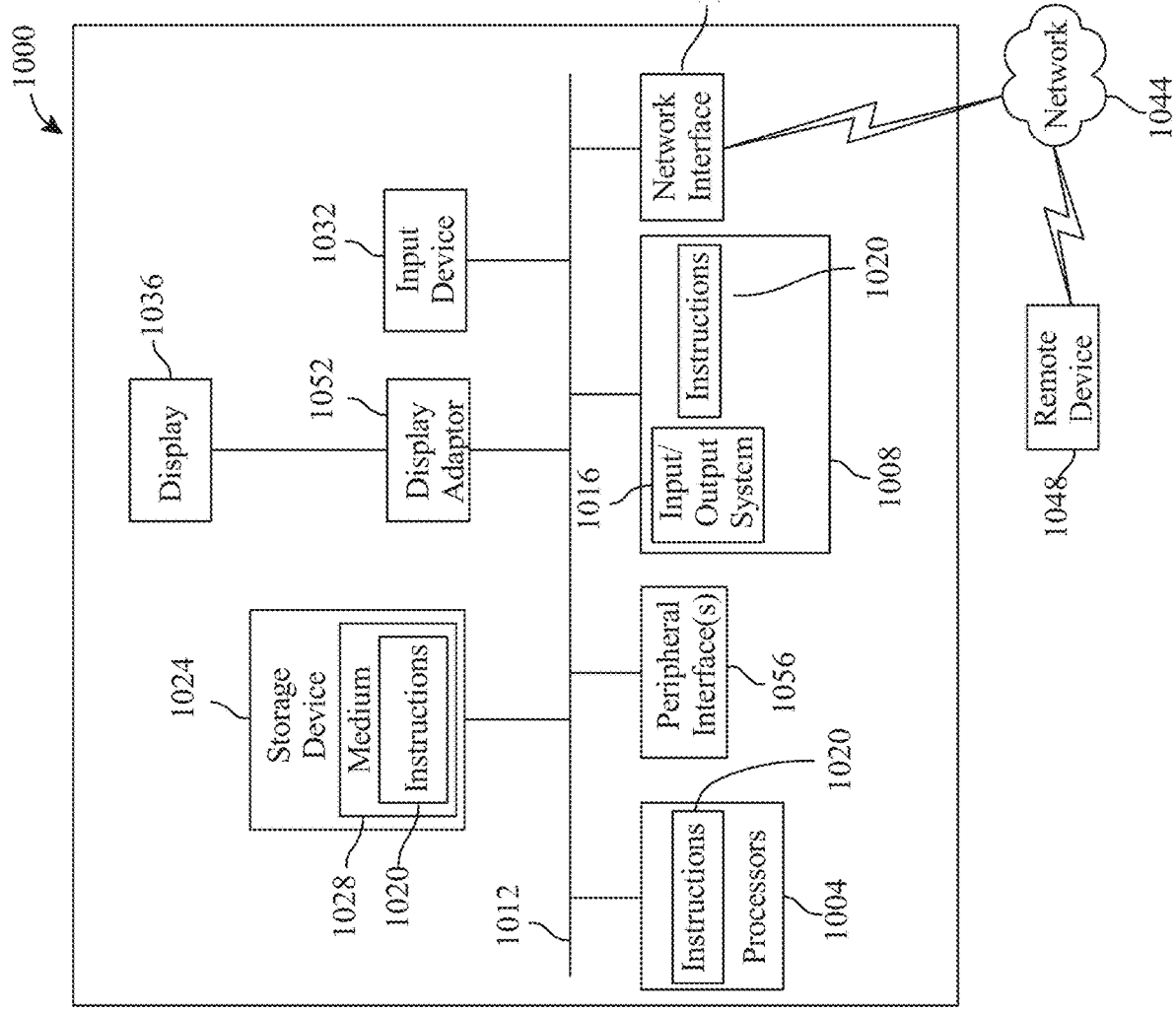
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 916 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for higher-order growth modeling, wherein the apparatus comprises:
   at least a processor; and
   a memory communicatively connected to the at least a processor, wherein the memory contains instructions configuring the at least a processor to:
   receive a growth constraint profile from a user, wherein the growth constraint profile comprises a growth constraint associated with an entity, wherein the growth constraint comprises an entity record including a lack of a resource;
   convert the entity record into machine-encoded text by an optical character recognition (OCR) process using an optical character reader, wherein converting the entity record into the machine-encoded text comprises converting images of text in the entity record into the machine-encoded text and further comprises:
      pre-processing image components of the images, wherein pre-processing the image components comprises:
         de-skewing at least one of the image components by applying a homography transform to the at least one of the image components;
         using binarization to convert at least a portion of one of the images from color or greyscale to a binary image format; and
         using normalization to normalize an aspect ratio of at least one of the image components;
      implementing an OCR algorithm comprising a matrix matching process, wherein implementing the OCR algorithm comprises:
         comparing pixels of at least one of the pre-processed images to pixels of a stored glyph on a pixel-by-pixel basis; and
         ascertaining a similar font and scale therebetween based on the comparison; and
      post-processing an output of the matrix matching process to increase OCR accuracy by constraining the output to a lexicon containing a set of words whose occurrence is permitted;
   generate a plurality of strategy data as a function of the growth constraint including the machine-encoded text, wherein the plurality of strategy data comprises a first strategy datum and a second strategy datum;
   generate a strategy score as a function of the plurality of strategy data, wherein the strategy score reflects a likelihood of success of each of the plurality of strategy data for accomplishing an entity goal within a given time element, wherein generating the strategy score comprises:
      training, iteratively, a machine-learning model using score training data, wherein the score training data comprises historical data entries correlating prior strategy data to prior strategy scores, wherein the score training data is iteratively updated using previous outputs of the machine-learning model that indicate respective strategy scores, wherein the machine-learning model comprises an input layer of nodes, one or more intermediate layers of nodes and an output layer of nodes, and wherein training the machine-learning model comprises:

applying the score training data to the input layer of nodes, wherein the input layer of nodes comprises a plurality of the prior strategy data, and the output layer of nodes comprises a plurality of the prior strategy scores; and adjusting one or more connections and one or more weights between nodes in adjacent layers of the machine-learning model to iteratively update the output layer of nodes by updating the score training data applied to the input layer of nodes; and generating the strategy score as a function of the trained machine-learning model;

apply the plurality of strategy data and the strategy score to the growth constraint profile using a growth simulation, wherein the growth simulation is configured to iteratively generate an updated growth constraint associated with the entity from the growth constraint profile after the application of the plurality of strategy data, and wherein the application of the plurality of strategy data comprises:

applying the first strategy datum to the growth constraint profile; and applying the second strategy datum to the growth constraint profile;

predict growth data as a function of the application of the plurality of strategy data to the growth constraint profile;

identify second-order data as a function of the growth data; and display the second-order data using a display device.

2. The apparatus of claim 1, wherein receiving the growth constraint profile comprises receiving the growth constraint profile using a webcrawler.

3. The apparatus of claim 1, wherein receiving the growth constraint profile comprises receiving the growth constraint profile using a chatbot.

4. The apparatus of claim 1, wherein generating the plurality of strategy data comprises generating the plurality of strategy data using a strategy machine learning model.

5. The apparatus of claim 4, wherein generating the plurality of strategy data using the strategy machine learning model comprises:

training the strategy machine learning model using strategy training data, wherein the strategy training data contains a plurality of data entries containing the growth constraint profile as inputs correlated to the plurality of strategy data as outputs; and generating the plurality of strategy data as a function of the growth constraint profile using the strategy machine learning model.

6. The apparatus of claim 1, wherein the at least a processor is further configured to identify a plurality of correlation data as a function of the plurality of strategy data.

7. The apparatus of claim 6, wherein identifying the plurality of correlation data comprises identifying the plurality of correlation data using fuzzy logic.

8. The apparatus of claim 1, wherein the growth constraint profile comprises a plurality of growth constraints.

9. The apparatus of claim 1, wherein the at least a processor is further configured to identify an application plan as a function of the growth data and the growth simulation.

10. The apparatus of claim 1, wherein generating the growth simulation comprises generating the growth simulation as a function of a simulation machine learning model.

11. A method for higher-order growth modeling, wherein the method comprises:

receiving, using at least a processor, a growth constraint profile from a user, wherein the growth constraint profile comprises a growth constraint associated with an entity, wherein the growth constraint comprises an entity record including a lack of a resource;

converting, using the at least a processor, the entity record into machine-encoded text by an optical character recognition (OCR) process using an optical character reader, wherein converting the entity record into the machine-encoded text comprises converting images of text in the entity record into the machine-encoded text and further comprises:

pre-processing image components of the images, wherein pre-processing the image components comprises:

de-skewing at least one of the image components by applying a homography transform to the at least one of the image components;

using binarization to convert at least a portion of one of the images from color or greyscale to a binary image format; and using normalization to normalize an aspect ratio of at least one of the image components;

implementing an OCR algorithm comprising a matrix matching process, wherein implementing the OCR algorithm comprises:

comparing pixels of at least one of the pre-processed images to pixels of a stored glyph on a pixel-by-pixel basis; and ascertaining a similar font and scale therebetween based on the comparison; and post-processing an output of the matrix matching process to increase OCR accuracy by constraining the output to a lexicon containing a set of words whose occurrence is permitted;

generating, using the at least a processor, a plurality of strategy data as a function of the growth constraint including the machine-encoded text, wherein the plurality of strategy data comprises a first strategy datum and a second strategy datum;

generating, using the at least a processor, a strategy score as a function of the plurality of strategy data, wherein the strategy score reflects a likelihood of success of each of the plurality of strategy data for accomplishing an entity goal within a given time element, wherein generating the strategy score comprises:

training, iteratively, a machine-learning model using score training data, wherein the score training data comprises historical data entries correlating prior strategy data to prior strategy scores wherein the score training data is iteratively updated using previous outputs of the machine-learning model that indicate respective strategy scores, wherein the machine-learning model comprises an input layer of nodes, one or more intermediate layers of nodes and an output layer of nodes, and wherein training the machine-learning model comprises:

applying the score training data to the input layer of nodes, wherein the input layer of nodes comprises a plurality of the prior strategy data, and the output layer of nodes comprises a plurality of the prior strategy scores; and adjusting one or more connections and one or more weights between nodes in adjacent layers of the machine-learning model to iteratively update the output layer of nodes by updating the score training data applied to the input layer of nodes; and
generating the strategy score as a function of the trained machine-learning model;

applying, using the at least a processor, the plurality of strategy data and the strategy score to the growth constraint profile using a growth simulation, wherein the growth simulation is configured to iteratively generate an updated growth constraint associated with the entity from the growth constraint profile after the application of the plurality of strategy data, and wherein the application of the plurality of strategy data comprises:

applying the first strategy datum to the growth constraint profile; and
applying the second strategy datum to the growth constraint profile;

predicting, using the at least a processor, growth data as a function of the application of the plurality of strategy data to the growth constraint profile;
identifying, using the at least a processor, second-order data as a function of the growth data; and
displaying, using the at least a processor, the second-order data using a display device.

12. The method of claim 11, wherein receiving the growth constraint profile comprises receiving the growth constraint profile using a webcrawler.

13. The method of claim 11, wherein receiving the growth constraint profile comprises receiving the growth constraint profile using a chatbot.

14. The method of claim 11, wherein generating the plurality of strategy data comprises generating the plurality of strategy data using a strategy machine learning model.

15. The method of claim 14, wherein generating the plurality of strategy data using the strategy machine learning model comprises:

training the strategy machine learning model using strategy training data, wherein the strategy training data contains a plurality of data entries containing the growth constraint profile as inputs correlated to the plurality of strategy data as outputs; and
generating the plurality of strategy data as a function of the growth constraint profile using the strategy machine learning model.

16. The method of claim 11, wherein the method further comprises identifying, using the at least a processor, a plurality of correlation data as a function of the plurality of strategy data.

17. The method of claim 16, wherein identifying the plurality of correlation data comprises identifying the plurality of correlation data using fuzzy logic.

18. The method of claim 11, wherein the growth constraint profile comprises a plurality of growth constraints.

19. The method of claim 11, wherein the method further comprises identifying, using the at least a processor, an application plan as a function of the growth data and the growth simulation.

20. The method of claim 11, wherein generating the growth simulation comprises generating the growth simulation as a function of a simulation machine learning model.

* * * * *